Figure 1:
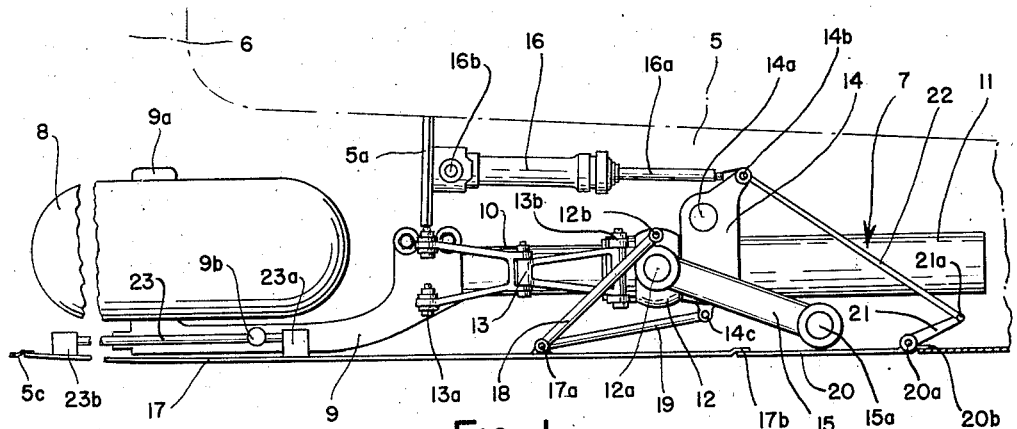

Nov. 18, 1947.  H. C. TRICH  2,431,093
RETRACTABLE LANDING GEAR
Filed Feb. 22, 1943

HENRY C. TRICH.
*INVENTOR.*

BY *James M. Clark*
HIS ATTORNEY.

Patented Nov. 18, 1947

2,431,093

UNITED STATES PATENT OFFICE 2,431,093

RETRACTABLE LANDING GEAR

Henry C. Trich, Chicago, Ill., assignor to North American Aviation, Inc., Inglewood, Calif., a corporation of Delaware Application February 22, 1943, Serial No. 476,700

14 Claims. (Cl. 244—102)

The present invention relates to retractable landing gears for aircraft and to automatically operating fairing closures for such landing gears.

In providing retractable landing gears for high performance aircraft, designers have heretofore been restricted by the necessity of making the gear of sufficient height to provide proper ground clearance for the propellers and sufficient overall tread to provide adequate stability in landing, take-off and taxiing operations. These conditions frequently require a landing gear of such length that difficulty is met with in stowing the gear, particularly in the thin wings of smaller high speed aircraft, and they further require that the pivotal supports for the gear be located at such greater distances from the fuselage that the wing structure has to be made excessively heavy due to the increased bending loads. Such landing gears also necessitate providing a larger opening in the wing lower surface and require correspondingly larger fairing doors with their accompanying operating struts, timing valves, locks and like equipment. A number of unsatisfactory efforts have been made in the past to provide retractable landing gears and fairing doors which do not include these inherent disadvantages but each has resulted in a rather complicated, heavy and otherwise inefficient structure.

This applicant has overcome these difficulties by a novel actuating and suspension arrangement for the upper element of the main landing gear strut, comprising essentially a rotatable retracting head element through which the upper portion of the strut element is permitted to slide, and a shortening truss or link pivotally connected to the wing structure and to the lower portion of the strut element, thereby automatically imparting the desired sliding movement through the head element, resulting in material lengthening in the extended position and shortening in the retracted position. The present arrangement also includes a novel linkage whereby main and auxiliary fairing doors are linked to the sliding head and fixed fittings of the upper strut element to provide automatic opening and closing of the doors concurrently with extension and retraction of the gear; the entire assembly being relatively simple in arrangement with a minimum number of light, compact elements.

It is accordingly a major object of the present invention to provide a retractable landing gear of a simple but efficient type which permits maximum ground clearance and overall tread while at the same time imposing a minimum stressing upon the wing structure and requiring a correspondingly smaller opening in the lower wing surface into which the landing gear and its attached wheel are stowed. It is also a principal object to provide a retractable landing gear which is supported upon the aircraft structure in a manner such that the main shock absorbing strut is extended downwardly from its structural support in the extended position to provide greater ground clearance for the propeller; and in which when retracted the main strut is bodily moved such that its top portion is slid through the retracting head and is moved laterally within the aircraft body or wing, and its midportion is drawn toward the structural points of support referred to.

It is a further object of the present invention to provide a retractable landing gear arrangement in which the maximum wheel tread is obtained while keeping the spanwise distance between the gear mounting points reduced to a minimum to allow of lighter construction of the wing. It is a still further object of the present invention to provide a landing gear structure rotatable about two closely spaced pivots which are in turn more closely spaced from the plane of symmetry of the aircraft than is usually possible. A further object resides in the provision of a strut supporting structure which is simple and positive in its operation and in which the landing wheel will fall by gravity into an extended operative position.

It is also an object of this invention to provide, in a landing gear structure of the present type, suitably articulated fairing doors which automatically open to permit gear extension and correspondingly close to fair the wheel and strut openings when the landing gear is housed within the aircraft. A still further object resides in the provision of a novel linkage assembly for the automatic actuation of the fairing doors whereby they position accurately, clear each other during their respective movements and in which the main fairing door is moved upwardly in its extended position to provide suitable ground clearance.

Figure 2:
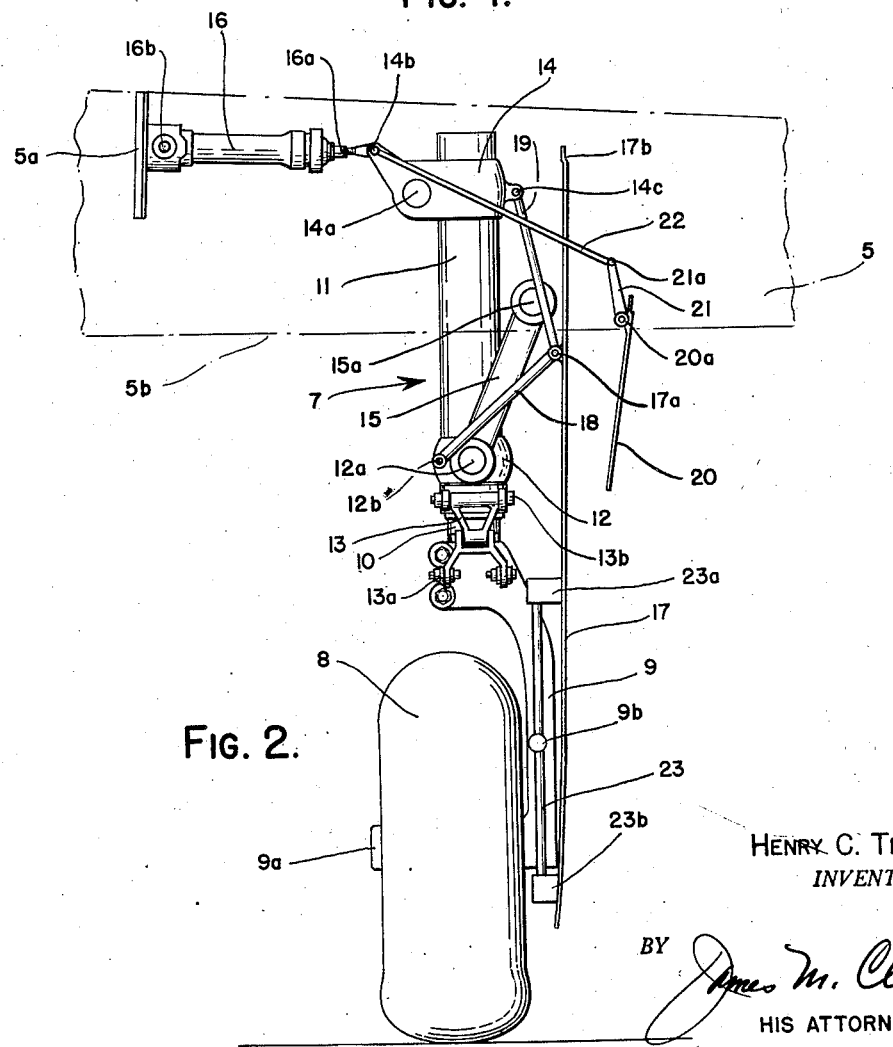

Other objects and advantages of the present invention will become apparent to those skilled in the art after a reading of the present specification and the accompanying drawings in which:

Fig. 1 shows a preferred form of the present landing gear and fairing door assembly in the retracted position; and Fig. 2 shows the same landing gear and fairing doors in the extended operative position.

The preferred embodiment of the present invention has been shown in the drawings as installed in a low wing, high performance airplane of the single-motored type; it should be understood, however, that the novel features of the present invention are equally applicable to multi-motored aircraft, and to wings which are disposed both higher and lower with respect to the fuselage than has been shown in the drawings; and to installations which may be retracted in the fore and aft direction as well as in the laterally inward direction shown in the drawings. The low wing 5 of an airplane provided with a central fuselage indicated at 6, is provided with an opening 5b in its lower surface to provide for the passage of the strut 7 and wheel 8 therethrough. The main shock absorbing strut 7 has been indicated as of the oleo type having attached to its lower or piston element 10 a wheel-carrying member 9 provided with a wheel axle 9a for the landing wheel 8. The piston element 10 is resiliently telescopic in an axial direction within the strut cylinder 11 and relative rotation therebetween is prevented by the torque scissors or "nut-cracker" linkage 13 which is pivoted at 13a to the wheel fitting 9 and to the cylinder element 11 by means of the pivot 13b.

A pivot fitting 12 is fixedly attached to the cylinder portion 11 and carries a pivot pin at 12a for pivotal connection to the shortening trusses or links 15 and a smaller pivot at 12b for the main door actuating link 18. A gear retracting head fitting 14 is pivotally mounted upon the wing structure at 14a and is provided with a bore within which the cylinder portion 11 is adapted to slide, or be guided. The retracting head fitting is provided with an obliquely extending lug portion which carries the pivot 14b for the connection to the retracting piston 16a and also for the actuating link 22 to the auxiliary fairing door 20. The shortening truss, or link, 15 is similarly pivoted upon the wing structure at 15a adjacent the lower surface 5b of the wing and preferably closely spaced outwardly from the axis of the main strut 7. The hydraulic retracting cylinder 16 provided with the actuating piston rod 16a, is pivotally mounted by means of the pivot fitting 16b upon the wing bulkhead or structure 5a, the free end of the piston rod 16a being pivoted by a suitable adjustable clevis fitting to the above mentioned pivot 14b on the retracting head fitting 14.

The opening 5b in the wing lower surface is faired by the main fairing closure or door 17 at the inner or wheel side of the landing gear and by the auxiliary fairing door 20 on the outboard side. The inner edge of the opening 5b is provided with an offset seat or lip 5c and the outboard edge of the main fairing door 17 is similarly joggled at 17b to provide a seat for the auxiliary door 20. The latter is similarly offset at 20b to provide a flush lower surface where this door meets the outer edge of the opening adjacent the pivot fitting 20a.

A main closure link 18 is pivotally mounted upon the main closure at 17a and at its other terminal it is pivotally connected at 12b to the pivot fitting 12 fixed to the strut cylinder 11. An actuating link 19 is also pivotally connected at 17a and to the gear retracting head fitting 14 at the pivot connection 14c. An auxiliary fairing door actuating arm 22 is pivotally connected to the gear retracting head pivot at 14b and at its other extremity through the pivotal connection 21a to the auxiliary door operating bellcrank 21. The latter is fixed to the auxiliary door 20 at the fitting 20a such that as the bellcrank 21 is rotated the fairing door moves through a similar angle of rotation. In order to maintain the lower portion of the main fairing closure 17 in its proper relationship to the wheel-carrying member 9 the latter is provided with an apertured bracket pin 9b which serves as a guide for the rod 23 supported by the fittings 23a and 23b which are fixedly attached to the lower portion of the closure member. Suitable locks of any known type may be used to retain the landing gear strut in both its extended and retracted positions, these locks being sufficiently well known in the art that they have been omitted from the drawings and are not deemed necessary to describe in detail. It will also be understood that a suitable hydraulic control valve and piping system is provided for the control and operation of the actuating cylinder 16 and that the present invention is equally capable of actuation either manually, mechanically, electrically or otherwise.

To extend the landing gear strut 7 and its wheel 8 from the retracted position shown in Fig. 1, the control valve for the hydraulic actuating cylinder 16 is moved into the position which causes the piston to move inwardly and the piston rod 16a to impart rotation in a counter-clockwise direction to the gear retracting head 14 about its fixed pivot 14a. Rotation of the head fitting 14 imparts like counter-clockwise rotation in a lateral and outward direction to the strut assembly 7, which is caused to rotate therewith but to permit relative sliding in an axial direction. Since the shortening link 15 is rotatable about the fixed pivot 15a and pivotally attached at 12a to the pivot fitting 12, which is rigidly attached to the piston portion 11 of the strut, the dropping of the strut and wheel assembly due to gravity is restrained and controlled by the shortening truss 15 which causes the pivot 12a to be swung on an arc about 15a as a center in a counter-clockwise direction until the pivot 12a is located below and outboard of the fixed pivot 14a.

When the shock absorber strut assembly 7 reaches its extended position within a substantially vertical plane as viewed in Fig. 2, or other predetermined position, its movement is arrested by suitable stop and locking means which are not shown. In certain installations this limit to the rotation of the strut 7 may be determined by the position of the piston within the actuating cylinder 16 when the piston rod 16a is fully telescoped or contracted within the cylinder. It will be noted that in the extended position of the wheel substantially all vertical landing loads and impacts are transmitted from the cylinder portion 11 through the fitting 12 and its pivot 12a to the shortening link, or links, 15 to the pivot 15a which is fixedly carried upon the supporting structure. Since the axis of the pivot 12a is not permitted to move inwardly or upwardly due to the restraint imposed upon the cylinder 11 by the head fitting 14, substantially all of the loads transmitted to the cylinder portion are taken up by the inclined shortening truss 15, the sliding relationship of the cylinder within the head fitting 14 permitting the latter to absorb only lateral forces and components which are imposed upon the strut 7.

Simultaneously as the landing gear is extended from its position at Fig. 1 to that shown in Fig. 2 the counter-clockwise rotation of the head fitting 14 imparts similar counter-clockwise rotation to the bellcrank 21 about its fixed pivot 20a due to the interconnecting link 22 at its pivotal connections 14b and 21a, thereby imparting similar counter-clockwise rotation to the auxiliary door 20 until it assumes a final position as indicated in Fig. 2. At the same time the counter-clockwise rotation of the head fitting 14 moves the link 19 outwardly and upwardly from its nearly horizontal initial position in Fig. 1 to its position slightly beyond the vertical in Fig. 2. The link 19, being pivotally attached to the main fairing door 17 at the pivot fitting 17a, accordingly draws the upper end of the main door upwardly and outwardly slightly beyond the fixed pivot 15a. The position of the upper end of the main door is also controlled by the path of the actuating link 19, the pivotal connection 12b of which follows the pivot fitting 12b down to the extended position shown in Fig. 2.

Accordingly, in the extended position of the wheel the pivots 12b and 14c at the diverging terminals of the links 18 and 19 are widely separated and the pivot 17a at their vertex is disposed such that the upper portion of the door is maintained outboard of the vertical axis of the main strut assembly 7 such that it clears the pivot 15a and links 15; and is also such that during the extension of the landing gear the pivot support 17a has been moved from a position below and inboard of the pivot fitting 12 to a position above and outboard of the latter fitting such that the main door 17 has been moved upwardly away from the wheel 8 to provide suitable ground clearance in the extended position. As mentioned above, the lateral spacing of the lower or inner portion of the main door 17 with respect to the wheel strut 9 is at all times maintained at a predetermined relationship by the guide rod 23 passing through the aperture in the guide pin 9b, the fairing door moving from its position in Fig. 1 in which it extends beyond the contact plane of the wheel 8 to its retracted position with respect to the extended wheel in Fig. 2 in which the lower rail support fitting 23b engages a suitable stop carried beneath the axle portion 9a and suitable ground clearance is thereby provided.

The wheel is maintained in its proper direction with respect to the cylinder portion 11 by means of the torque scissors 13 which while preventing any relative rotation between the piston 10 and the cylinder 11, permits relative telescopic shock absorbing movement. The present invention is not, however, limited to the inclusion of rotation prevention means such as splines or the "nutcracker" linkage which has been shown, but is equally applicable to landing gears of the swivable or castoring type in which shimmy damping, restoring or centralizing means are usually provided to properly position the wheel before or during its retraction. Also, while the strut assembly 7 has been indicated as of the shock absorbing type permitting a telescoping movement from the unloaded condition of the wheel in Fig. 1 to that in which the strut is fully compressed as shown in Fig. 2, the invention is not necessarily limited to a retractable landing gear having shock absorbing means. Since both the shortening link 15 is pivotally connected to the fitting 12 fixedly attached to the cylinder element 11, and the gear retracting head fitting 14 also acts upon and permits sliding of the same cylinder element 11, it will be apparent to those skilled in the art that in certain installations in aircraft and other vehicles, as for instance in the beaching gear of flying boats, where shock absorbing means is not necessary, that the same may be dispensed with together with the torque prevention means, and the wheel-carrying fitting 9 either attached to or made an integral part of the upper strut portion to which the shortening link is pivoted and which slides through the gear retracting head fitting.

It will accordingly be noted that the present invention provides a compact and efficient landing gear which additionally is of such a nature that the force required to retract the gear is more uniform since the C. G. moves nearer the pivot point as the gear is retracted. It is also such that there is less change in the C. G. of the airplane as the gear is moved from the extended to the retracted position and vice versa. This is especially true in the case of fore and aft retraction.

The present landing gear is also adapted for fore and aft retraction when used in the engine nacelles of multi-engined aircraft; and in these installations much shorter fairing doors can be used, the extent of shortening being almost as much as the distance the strut is allowed to slide thru the pivoted head. The reduced stowage space required for the gear also permits shortening of the nacelle, and where other design features do not permit this shortening, the additional stowage space gained can be utilized for oxygen bottles, fire extinguishing equipment and the like.

Other forms and modifications of the present invention which may become apparent to those versed in the art, both with respect to the general arrangement and the details of its various component parts, are intended to be embraced within the scope and spirit of this invention, as more definitely set forth in the appended claims.

I claim:

1. In aircraft landing gear construction, an aircraft structure, a main telescopic strut, a retracting element pivotally mounted upon said aircraft structure and slidably engaging an end portion of said main strut, a link member pivotally connected to the intermediate portion of said strut adapted to transmit the loads therefrom to said aircraft structure, actuating means pivotally connected to said retracting element adapted to rotate the same for extension and retraction of said main strut, whereby during extension of said landing gear said link member is adapted to extend the intermediate portion of said main strut away from the pivotal axis of said retracting element and during the retraction of said landing gear to draw said intermediate portion toward said pivotal axis of said retracting element.

2. In aircraft, a laterally retractable landing gear including a main strut, a retracting member slidably engaging an end portion of said strut, said retracting member being pivotally supported upon said aircraft inwardly of said strut when extended, actuating means adapted to impart rotation to said retracting member for extension and retraction of said landing gear, a ground-engaging member operatively carried upon the free end of said landing gear, and link means associated with said landing gear pivoted upon said aircraft outwardly of said strut when extended operable to cause secondary movement of said ground-engaging member toward said rotational axis of said retracting member during retraction and away from said axis during extension of said landing gear, the said link means being pivotally mounted upon said aircraft closely adjacent the axis of said main strut such that the loads thereof are fully transmitted through said link means only while the strut is in its extended position.

3. In aircraft, a laterally retractable landing gear including a main strut cylinder, a member slidably engaging the upper portion of said strut cylinder, said member being pivotally supported upon said aircraft, actuating means adapted to impart rotation to said member for extension and retraction of said landing gear, a ground-engaging member operatively carried upon the free end of said landing gear, link means pivotally associated with the lower portion of said strut cylinder operable to cause secondary movement of said ground-engaging member toward said rotational axis of said member during retraction and away from said axis during extension of said landing gear, and closure means associated with said landing gear adapted to automatically fair the same in its retracted position.

4. In aircraft, retractable landing gear comprising a main shock absorbing strut including a lower piston element and an upper cylinder element, a ground-engaging wheel rotatably carried by said piston element, torque means to prevent relative rotation between said piston and cylinder elements, a retracting member slidably engaging said cylinder element and pivotally mounted upon said aircraft structure, actuating means operatively engaging said retracting member adapted upon rotation thereof to impart extension and retraction to said landing gear, a link member pivotally supported upon said aircraft structure and having a second pivot spaced therefrom pivotally connected to said cylinder element, an opening through the outer surface of said aircraft through which said landing gear is adapted to be retracted, a main closure element pivotally interconnected to said cylinder element and to said retracting member, an auxiliary closure element pivotally mounted upon the aircraft structure and pivotally connected with said retracting member whereby rotation of said retracting member for retraction of said landing gear imparts rotational and retracting movement of said landing gear, the said link member imparts secondary sliding movement of said cylinder element through said retracting member, and also imparts automatic movements of said closure elements to a fairing relationship with the opening in said aircraft surface.

5. In a retractable landing gear for an aircraft structure, a main landing gear strut comprising telescoping piston and cylinder elements, a retracting bell-crank fitting pivotally mounted upon said aircraft structure guidingly embracing the upper portion of one of said elements, a link member pivotally connected to said aircraft structure and to a lower portion of said telescoping elemnt, said link member adapted in the extended position of the landing gear to transmit to said structure substantially all of the vertical loads to which said landing gear is subjected, actuating means pivotally connected to said bell-crank retracting fitting adapted to impart rotation thereto about its pivotal mounting and thereby cause concurrent retraction of said landing gear, said link member adapted during retraction to draw its pivotal connection to said telescoping element toward said retracting fitting for the sliding retraction of said element therethrough, an opening in the lower surface of said aircraft structure through which said landing gear is adapted to be retracted, and closure means pivotally connected to said actuating means adapted to automatically fair said opening upon retraction of said landing gear.

6. A suspension arrangement for an aircraft landing gear comprising a main strut subjected in its extended position to axial and transverse loads, a bell-crank pivotally supported upon the aircraft on a first side of said strut adapted to slidably engage the upper portion of said strut for the transmission of said transverse loads, links pivotally supported upon said aircraft on the opposite side of said strut and connected to a lower portion of said strut adapted for the transmission of said axial loads in the said extended position only and means operatively connected to said bell-crank arranged for its rotation and the retraction of said landing gear.

7. A suspension arrangement for an aircraft landing gear comprising a main strut subjected to axial and transverse loads, ground-engaging means carried upon a lower portion of said strut, an element pivotally supported upon the aircraft structure adapted to slidingly embrace the upper portion of said strut adapted for the transmission of said transverse loads, a link member pivotally attached to said aircraft and an intermediate portion of said strut adapted for the transmission of said axial loads to the aircraft structure, the said pivotal supports of said element and said link member being disposed on opposite sides of said strut in said load transmitting position and power means operatively connected to said upper pivotal element arranged for the retraction of said landing gear.

8. A suspension arrangement for a retractable aircraft landing gear comprising a main strut subjected to axial and transverse loads, a bell-crank retracting element pivotally supported upon the aircraft adapted to guidingly embrace the upper portion of said strut adapted for the transmission of said transverse loads, and a link member pivotally attached to said aircraft and to a lower portion of said strut adapted for the transmission of said axial loads and means to rotate said bell-crank element for the sliding retraction of said strut therethrough whereby both rotary and translatory movements are imparted to said main strut.

9. A retractable landing gear strut suspension comprising an upper bell-crank element pivotally supported upon adjacent structure and slidingly engaging an upper portion of said strut, and a lower link element pivotally supported upon said structure and pivotally engaging a lower portion of said strut spaced from the first said link pivot whereby said upper element restrains said strut laterally and said lower element restrains axial movement of said strut through said upper bell-crank element and retracting means for the rotation of said bell-crank element to a position in which it relieves said lower link element of the weight of said strut.

10. A retractable aircraft landing gear comprising a main strut subjected to axial and transverse loads in its extended position, ground-engaging means carried upon a lower portion of said strut, a bell-crank retracting element pivotally supported upon the aircraft adapted to guidingly embrace the upper portion of said strut adapted for the transmission of said transverse loads, a link member pivotally attached to said aircraft and to an intermediate portion of said strut adapted for the transmission of said axial loads, and actuating means adapted to rotate said bell-crank retracting element whereby said strut is both retractingly rotated and translated about the pivotal mounting of said link member and slidingly guided through the said retracting element.

11. Retracting mechanism for an aircraft landing gear comprising a main strut including a cylinder, a retracting element pivotally supported upon the aircraft and slidingly embracing the upper portion of said cylinder, a member pivotally attached to said aircraft and to a lower portion of said cylinder, the pivotal axes of said element and said member being disposed on opposite sides of said strut, and actuating means adapted to rotate said element about its pivotal mounting for the rotative and translative retraction of said strut and cylinder about the pivotal mounting of said member and through the said retracting element.

12. In an aircraft structure, a suspension arrangement for a retractable landing gear strut comprising a bell-crank pivotally supported upon the adjacent aircraft structure on a first side of said strut and slidingly engaging said strut, and link means pivotally engaging said strut and pivotally supported upon the adjacent aircraft structure on a side opposite said first side of said strut on a pivotal axis spaced from the axis of its pivotal engagement with said strut arranged in such manner that retractive rotation of said bell-crank causes the said link-to-strut pivot to closely approach the said bell-crank pivot and facilitate stowing of the strut and extensive rotation causes remote separation of said pivots to increase the extension of the strut.

13. A retractable landing gear arrangement as set forth in claim 12 characterized by the provision of a strut fairing door for an opening in said aircraft, and means pivotally connecting said door to said bell-crank and to said strut arranged to move said door upwardly with respect to said strut upon its extension into a landing position.

14. A retractable landing gear installation for an aircraft comprising an upper strut element, a lower wheel-carrying element, a first strut support pivoted to said upper strut element and separately pivoted to the aircraft, a second strut support pivoted to the aircraft and slidably engaging said upper strut element, said aircraft having an opening through which said landing gear is retracted, a fairing for closing said opening, guide means carried by said lower element for relative movement of said fairing with respect thereto and means connecting said fairing to said upper strut and to said second strut support adapted to withdraw said fairing from the landing wheel to facilitate landing upon extension of the gear and to extend said fairing beyond said wheel upon retraction to close the said aircraft opening.

HENRY C. TRICH.

REFERENCES CITED

The following references are of record in the file of this patent:

UNITED STATES PATENTS

| Number | Name | Date |
|---|---|---|
| 2,296,117 | Pevney | Sept. 15, 1942 |
| 2,105,374 | Saulnier | Jan. 11, 1938 |
| 2,332,453 | Martin | Oct. 19, 1943 |

FOREIGN PATENTS

| Number | Country | Date |
|---|---|---|
| 643,579 | Germany | Apr. 12, 1937 |
| 539,625 | Great Britain | Sept. 18, 1941 |